United States Patent
Lan et al.

(10) Patent No.: US 10,546,123 B1
(45) Date of Patent: Jan. 28, 2020

(54) SYSTEMS AND METHODS FOR IDENTIFYING MALICIOUS COMPUTER FILES

(71) Applicant: Symantec Corporation, Mountain View, CA (US)

(72) Inventors: Qichao Lan, Culver City, CA (US); Mark Kennedy, Gardena, CA (US); XueFeng Tian, Culver City, CA (US); Barry Laffoon, Glendale, CA (US)

(73) Assignee: CA, Inc., San Jose, CA (US)

( * ) Notice: Subject to any disclaimer, the term of this patent is extended or adjusted under 35 U.S.C. 154(b) by 132 days.

(21) Appl. No.: 15/632,280

(22) Filed: Jun. 23, 2017

(51) Int. Cl.
*G06F 21/56* (2013.01)
*G06N 20/00* (2019.01)

(52) U.S. Cl.
CPC ............ *G06F 21/56* (2013.01); *G06F 21/568* (2013.01); *G06N 20/00* (2019.01)

(58) Field of Classification Search
CPC .......... H06F 21/50; H06F 21/55; H06F 21/56; H06F 21/60; H06F 21/557; H06F 17/30598; H06F 17/30705; H06F 17/30289; H06F 17/30292; H04L 9/0836; H04L 9/3265; G06N 99/00
USPC ........... 726/22–25; 706/12, 20, 21; 707/737, 707/747, 797, 758; 713/165, 177
See application file for complete search history.

(56) References Cited

U.S. PATENT DOCUMENTS

| | | | |
|---|---|---|---|
| 8,176,555 B1 * | 5/2012 | Schreiner | G06F 21/566 726/23 |
| 8,302,193 B1 * | 10/2012 | Gardner | G06F 21/57 707/758 |
| 8,375,450 B1 * | 2/2013 | Oliver | G06F 21/564 726/24 |
| 9,762,593 B1 * | 9/2017 | Kennedy | H04L 63/1416 |
| 10,320,834 B1 * | 6/2019 | Kennedy | G06F 16/24578 |
| 2006/0123480 A1 * | 6/2006 | Oh | H04L 63/1408 726/23 |
| 2009/0300765 A1 * | 12/2009 | Moskovitch | G06F 21/562 726/24 |
| 2011/0162070 A1 * | 6/2011 | Krasser | G06F 21/564 726/23 |
| 2011/0283361 A1 * | 11/2011 | Perdisci | G06F 21/56 726/24 |
| 2014/0090061 A1 * | 3/2014 | Avasarala | G06F 21/56 726/24 |
| 2015/0058449 A1 * | 2/2015 | Garg | H04L 67/10 709/219 |
| 2015/0128156 A1 * | 5/2015 | Zhu | G06F 8/74 719/328 |

(Continued)

*Primary Examiner* — Saleh Najjar
*Assistant Examiner* — Khalid M Almaghayreh
(74) *Attorney, Agent, or Firm* — FisherBroyles, LLP (57) ABSTRACT

A computer-implemented method for identifying malicious computer files may include (i) receiving, by a computing device, a set of files from a set of client devices, (ii) performing, by the computing device, a machine learning classification of file attributes on the set of files, (iii) determining, based on the machine learning classification, a node pattern of a suspicious file in the set of files, (iv) calculating, by hashing the node pattern, a file prevalence score of the suspicious file, and (v) performing, by the computing device, a security action based on the file prevalence score of the suspicious file. Various other methods, systems, and computer-readable media are also disclosed.

14 Claims, 8 Drawing Sheets

(56) References Cited

U.S. PATENT DOCUMENTS

| | | | |
|---|---|---|---|
| 2015/0172303 A1* | 6/2015 | Humble | H04L 63/1408 |
| | | | 726/23 |
| 2015/0244732 A1* | 8/2015 | Golshan | G06F 21/561 |
| | | | 726/24 |
| 2016/0055427 A1* | 2/2016 | Adjaoute | G06N 20/00 |
| 2017/0262633 A1* | 9/2017 | Miserendino | G06F 21/566 |
| 2017/0359368 A1* | 12/2017 | Hodgman | H04L 63/1441 |
| 2018/0013772 A1* | 1/2018 | Schmidtler | H04L 63/1416 |
| 2018/0203998 A1* | 7/2018 | Maisel | G06F 21/565 |

* cited by examiner

SYSTEMS AND METHODS FOR IDENTIFYING MALICIOUS COMPUTER FILES

BACKGROUND

Computer security software may often use various file attributes to help determine whether certain files are potentially malicious or contain malware. To detect potentially malicious files, some security software may also use file prevalence to determine whether a computer file is unique or unusual. For example, a file that has a low prevalence within a large number and variety of known files may be a file that is highly unusual and, therefore, suspicious. On the contrary, a file with a high prevalence score may suggest that the file is common and likely to be legitimate, since many computers or users have the same or a similar file. File prevalence may also be used to determine the scope of potential threats caused by the proliferation of a malicious file.

Traditionally, a hash function may be performed on computer files to help identify the same files on multiple computing systems and to preserve file integrity. File prevalence may then be calculated on file hash values across multiple systems to determine whether files are common to similar systems. However, in some cases, minor changes to a file or a hash algorithm may result in a vastly different hash value for a file. The resulting hash value may appear to be uncommon and indicate a low file prevalence score, but the file may actually be very common. For example, a malicious file may make slight changes to escape detection by security software if the software only recognizes certain hash values as malware. Thus, reliance on file hashes may cause false positives in identifying potentially malicious files or may miss actual malicious files due to small differences in the files. The instant disclosure, therefore, identifies and addresses a need for improved systems and methods for identifying malicious computer files.

SUMMARY

As will be described in greater detail below, the instant disclosure describes various systems and methods for identifying malicious computer files. In one example, a computer-implemented method for identifying malicious computer files may include (i) receiving, by a computing device, a set of files from a set of client devices, (ii) performing, by the computing device, a machine learning classification of file attributes on the set of files, (iii) determining, based on the machine learning classification, a node pattern of a suspicious file in the set of files, (iv) calculating, by hashing the node pattern, a file prevalence score of the suspicious file, and (v) performing, by the computing device, a security action based on the file prevalence score of the suspicious file.

In one embodiment, the file attributes may include static attributes derived from a header of a file, metadata of the file, and/or a scan of file contents. In this embodiment, performing the machine learning classification may include extracting a set of features from the file attributes and constructing a set of decision trees to classify the set of features.

In some examples, determining the node pattern of the suspicious file may include classifying the suspicious file using one or more decision trees in the set of decision trees and identifying a set of nodes based on the decision tree classification. In these examples, hashing the node pattern may include aggregating the set of nodes into a single hash value. In additional examples, calculating the file prevalence score may include calculating a prevalence of the hash value in the set of files and/or identifying a family of files for the suspicious file based on the hash value.

In some embodiments, performing the security action may include flagging the suspicious file as potentially malicious, quarantining the suspicious file on a client device, and/or alerting an administrator about the suspicious file. Additionally or alternatively, performing the security action may include flagging the family of files as potentially malicious, quarantining another file in the family of files on the client device, and/or alerting an administrator about the family of files.

In one embodiment, a system for implementing the above-described method may include (i) a reception module, stored in memory, that receives, by a computing device, a set of files from a set of client devices, (ii) a performance module, stored in memory, that performs, by the computing device, a machine learning classification of file attributes on the set of files, (iii) a determination module, stored in memory, that determines, based on the machine learning classification, a node pattern of a suspicious file in the set of files, (iv) a calculation module, stored in memory, that calculates, by hashing the node pattern, a file prevalence score of the suspicious file, and (v) a security module, stored in memory, that performs, by the computing device, a security action based on the file prevalence score of the suspicious file. In addition, the system may include at least one processor that executes the reception module, the performance module, the determination module, the calculation module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive a set of files from a set of client devices, (ii) perform a machine learning classification of file attributes on the set of files, (iii) determine, based on the machine learning classification, a node pattern of a suspicious file in the set of files, (iv) calculate, by hashing the node pattern, a file prevalence score of the suspicious file, and (v) perform a security action based on the file prevalence score of the suspicious file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for identifying malicious computer files. As will be explained in greater detail below, by classifying files with decision trees, the systems and methods described herein may use classification node patterns to determine file prevalence for files in a network of computing devices. For example, by hashing a node pattern for a file, the disclosed systems and methods may use the hash value to determine the file prevalence based on various file attributes. In an organization or a known network of computing devices, the systems and methods described herein may use the file prevalence to determine the prevalence and scope of threats caused by malicious files that may infect the network. Furthermore, by using hashes of node patterns rather than individual files, the disclosed systems and methods may identify entire families of files that may be potentially malicious.

In addition, the systems and methods described herein may improve the functioning of a computing device by performing security actions to mitigate potentially malicious files. These systems and methods may also improve the fields of cybersecurity and/or network security by identifying and preventing attacks caused by malicious files. Thus, the disclosed systems and methods may improve the prevention of potential malware threats with improved malicious file detection.

Figure 1:
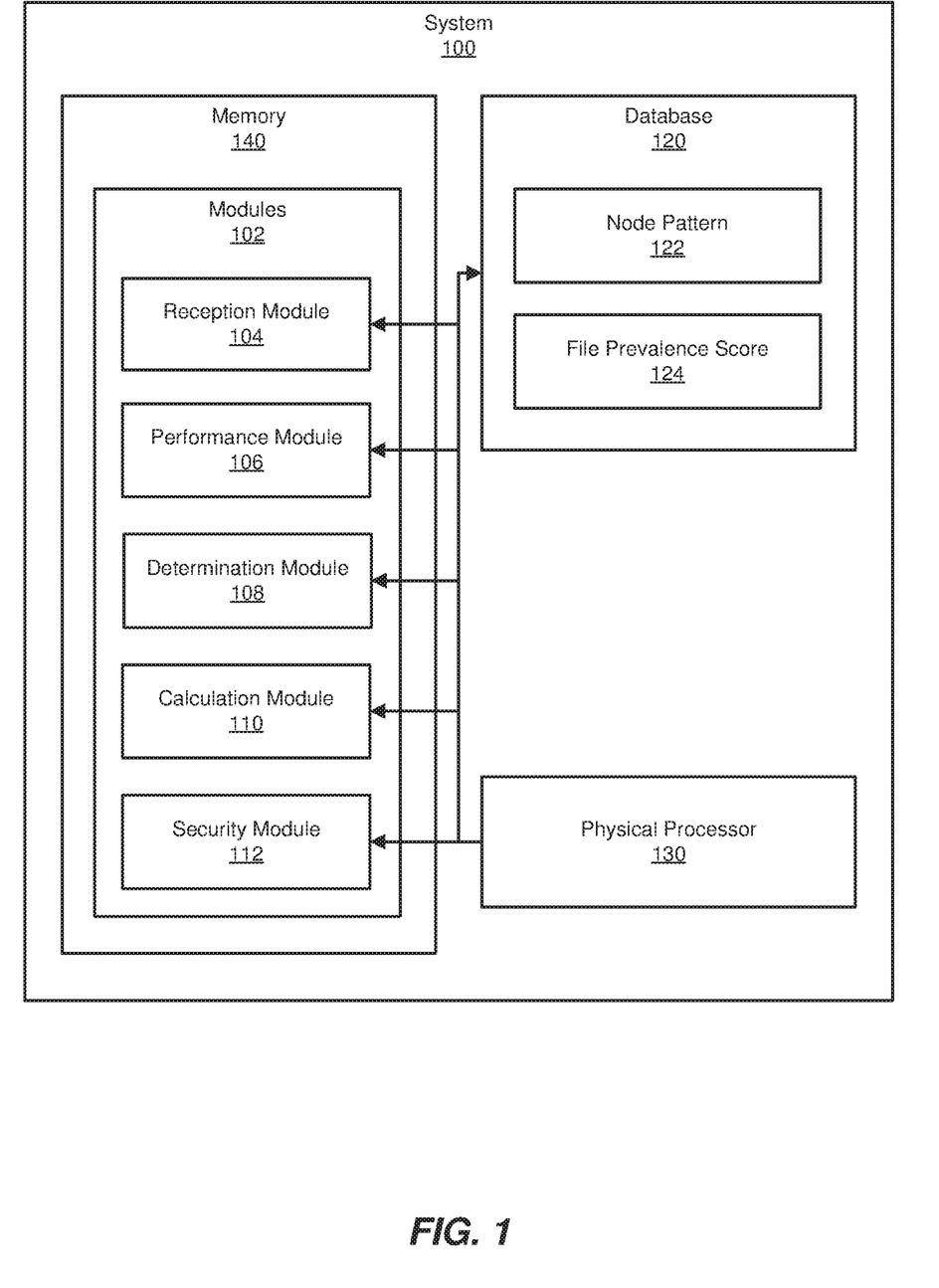
FIG. 1 is a block diagram of an example system for identifying malicious computer files.
Figure 2:
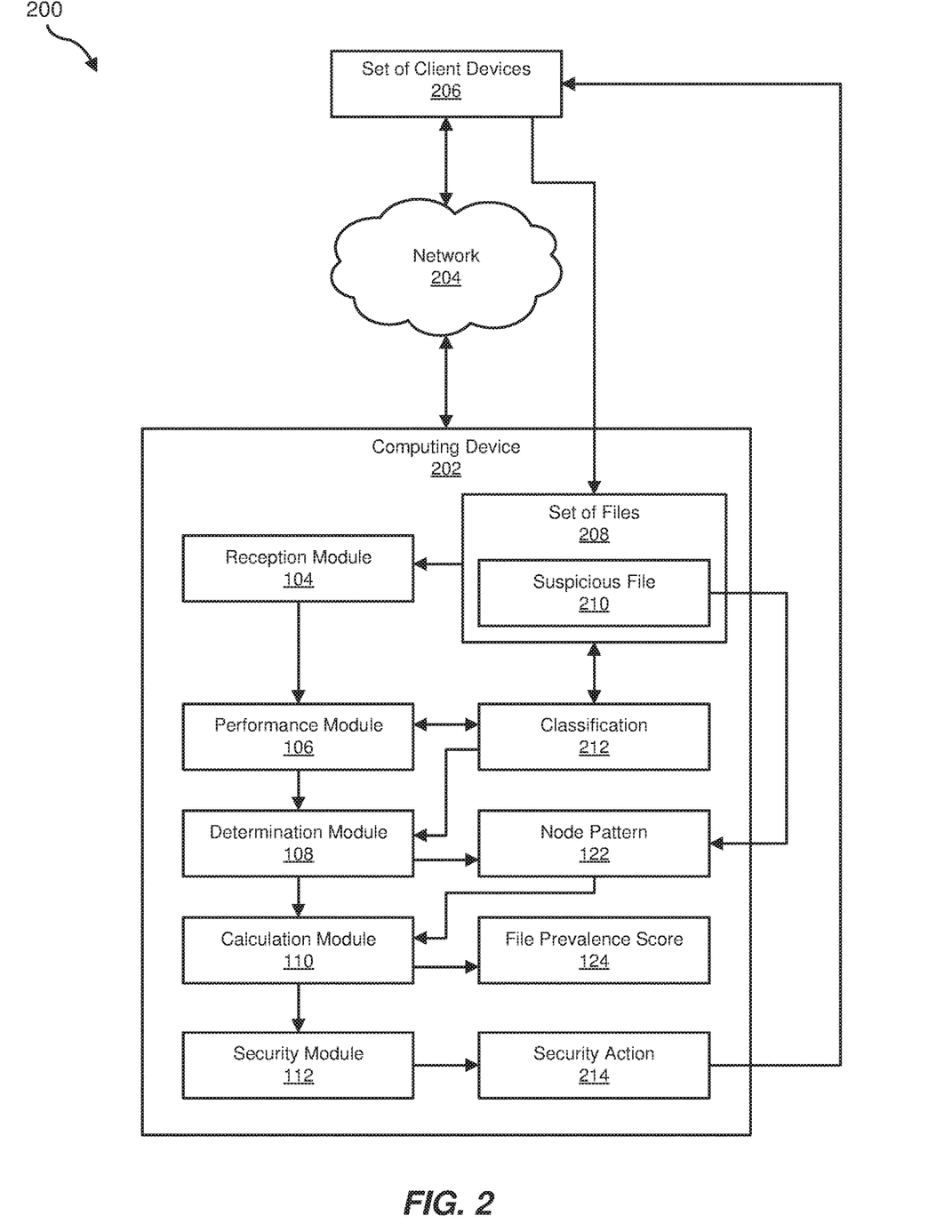
FIG. 2 is a block diagram of an additional example system for identifying malicious computer files.

The following will provide, with reference to FIGS. 1 and 2, detailed descriptions of example systems for identifying malicious computer files. Detailed descriptions of corresponding computer-implemented methods will also be provided in connection with FIG. 3. In addition, detailed descriptions of an example creation of an example set of decision trees will be provided in connection with FIG. 4. Detailed descriptions of an example hash of an example set of nodes for an example suspicious file will also be provided in connection with FIG. 5. Furthermore, detailed descriptions of an example family of files for an example suspicious file will be provided in connection with FIG. 6. Finally, detailed descriptions of an example computing system and network architecture capable of implementing one or more of the embodiments described herein will be provided in connection with FIGS. 7 and 8, respectively.

FIG. 1 is a block diagram of example system 100 for identifying malicious computer files. As illustrated in this figure, example system 100 may include one or more modules 102 for performing one or more tasks. For example, and as will be explained in greater detail below, modules 102 may include a reception module 104 that receives, by a computing device, a set of files from a set of client devices. Modules 102 may additionally include a performance module 106 that performs, by the computing device, a machine learning classification of file attributes on the set of files. As used herein, the term "machine learning" generally refers to a computational algorithm that may learn from data in order to make predictions. Examples of machine learning may include, without limitation, support vector machines, neural networks, clustering, decision trees, regression analysis, classification, variations or combinations of one or more of the same, and/or any other suitable supervised, semi-supervised, or unsupervised methods. Notably, a machine learning classification may allow a classifier to classify data into different categories based on various attributes of the data.

As illustrated in FIG. 1, modules 102 may also include a determination module 108 that determines, based on the machine learning classification, a node pattern of a suspicious file in the set of files. The term "node," as used herein, generally refers to a data value or condition used as a part of a tree data structure, which may be used as a classifier. Thus, the term "node pattern," as used herein, generally refers to a set of nodes or classifications derived from multiple classifiers.

Modules 102 may additionally include a calculation module 110 that calculates, by hashing the node pattern, a file prevalence score of the suspicious file. The term "hash," as used herein, generally refers to a process of converting digital data to a fixed value. The term "file prevalence," as used herein, generally refers to an indication of how common a file is among a set of files.

Modules 102 may further include a security module 112 that performs, by the computing device, a security action based on the file prevalence score of the suspicious file. Although illustrated as separate elements, one or more of modules 102 in FIG. 1 may represent portions of a single module or application or multiple modules or applications.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or set of client devices 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate identifying malicious computer files. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more databases, such as database 120. In one example, database 120 may be configured to store a node pattern 122, which may include a set of node classification for a file, and/or a file prevalence score 124, which may include a commonness for the file among a set of files. Database 120 may represent portions of a single database or computing device or a plurality of databases or computing devices. For example, database 120 may represent a portion of computing device 202 and/or set of client devices 206 in FIG. 2. Alternatively, database 120 in FIG. 1 may represent one or more physically separate devices capable of being accessed by a computing device, such as computing device 202 and/or set of client devices 206 in FIG. 2.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a set of client devices 206 via a network 204. In one example, all or a portion of the functionality of modules 102 may be performed by computing device 202, a device in set of client devices 206, and/or any other suitable computing system. Similarly, devices in set of client devices 206 and/or computing device 202 may be merged into a single machine or computing system such that the functionality of each of modules 102 is provided within a single device.

As will be described in greater detail below, one or more of modules 102 from FIG. 1 may, when executed by at least one processor of computing device 202 and/or set of client devices 206, enable computing device 202 and/or set of client devices 206 to calculate file prevalence for a set of files. For example, and as will be described in greater detail below, reception module 104 may receive a set of files 208 from set of client devices 206. Performance module 106 may perform a machine learning classification 212 of file attributes on set of files 208. Determination module 108 may determine, based on classification 212, node pattern 122 of a suspicious file 210 in set of files 208. Calculation module 110 may calculate, by hashing node pattern 122, file prevalence score 124 of suspicious file 210. Security module 112 may perform a security action 214 based on file prevalence score 124 of suspicious file 210.

In the example of FIG. 2, and as will be explained in greater detail below, computing device 202 may first receive set of files 208 from set of client devices 206 via network 204. Computing device 202 may then classify set of files 208 using classification 212. Next, computing device 202 may identify suspicious file 210 and determine node pattern 122 for suspicious file 210 based on classification 212. Computing device 202 may also calculate file prevalence score 124 for suspicious file 210 through hashing node pattern 122. Finally, computing device 202 may perform security action 214 on set of client devices 206.

Computing device 202 and/or set of client devices 206 generally represent any type or form of computing device capable of reading computer-executable instructions. For example, computing device 202 may represent an administrative device that monitors set of client devices 206, and devices in set of client devices 206 may represent endpoint devices running client-side security software. Additional examples of computing device 202 and/or set of client devices 206 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, and/or any other suitable computing device.

Network 204 generally represents any medium or architecture capable of facilitating communication or data transfer. In one example, network 204 may facilitate communication between computing device 202 and set of client devices 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
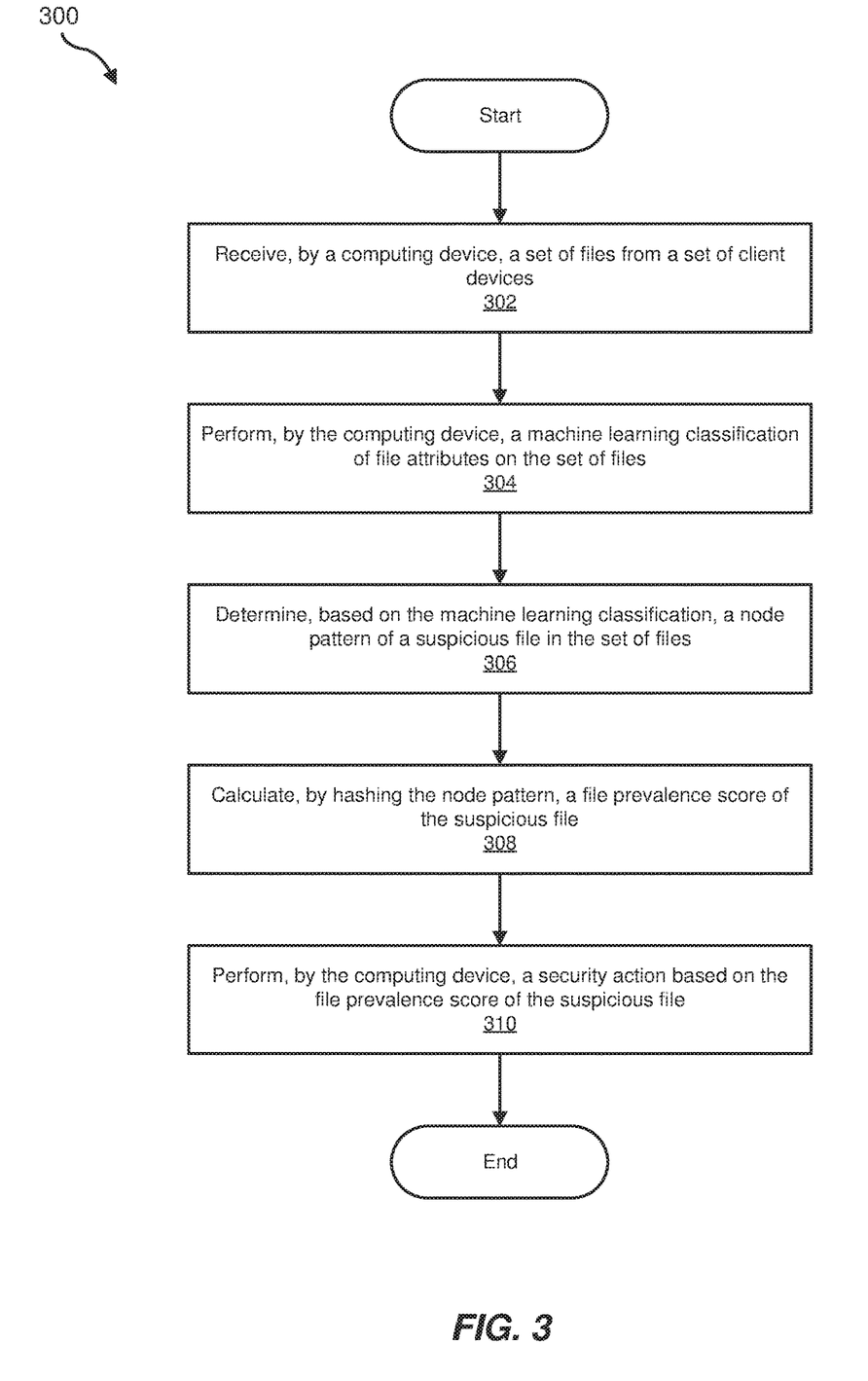
FIG. 3 is a flow diagram of an example method for identifying malicious computer files.

FIG. 3 is a flow diagram of an example computer-implemented method 300 for identifying malicious computer files. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may receive, by a computing device, a set of files from a set of client devices. For example, reception module 104 may, as part of computing device 202 in FIG. 2, receive set of files 208 from set of client devices 206.

Reception module 104 may receive set of files 208 in a variety of ways. In one example, reception module 104 may monitor all computing devices connected to network 204, such as set of client devices 206, and periodically request files from the connected devices. In another example, reception module 104 may collect files from newly connected computing devices and/or collect new files from existing computing devices to update set of files 208. Furthermore, in some examples, client-side security software on set of client devices 206 may send set of files 208 and/or information about set of files 208 to computing device 202 via network 204 for security analysis.

Returning to FIG. 3, at step 304, one or more of the systems described herein may perform, by the computing device, a machine learning classification of file attributes on the set of files. For example, performance module 106 may, as part of computing device 202 in FIG. 2, perform machine learning classification 212 of file attributes on set of files 208.

Performance module 106 may perform classification 212 in a variety of ways. In one embodiment, the file attributes may include static attributes derived from a header of a file, metadata of the file, and/or a scan of file contents. The term "header," as used herein, generally refers to descriptive information about a file. A file header may contain information about a file format, a file size, an identifier, and/or other specific information that describes a file. The term "metadata," as used herein, generally refers to data that describes a file and/or the structure of a file. Some file metadata may or may not be included in a file header. Additionally, the scan of file contents may include details about the file that may be found in a file header or file metadata and/or may include additional details about the contents of the file. The file attributes may include only attributes that are derived from set of files 208 and/or information about set of files 208.

In some examples, performance module 106 may perform classification 212 by extracting a set of features from the file attributes and constructing a set of decision trees to classify the set of features. The term "feature," as used herein, generally refers to a value or vector derived from data that allows it to be measured and/or interpreted as part of a machine learning method. Examples of features may include numerical data that quantizes a factor, textual data used in pattern recognition, graphical data, or any other format of data that may be analyzed using statistical methods or machine learning. The term "decision tree," as used herein, generally refers to a predictive model with a branching structure that graphs outcomes of observations. Decision trees may be created using a set of initial files or data to train the trees to accurately classify files using the features derived from the file attributes. The set of decision trees may also be trained to specifically use features that may indicate malicious files.

Figure 4:
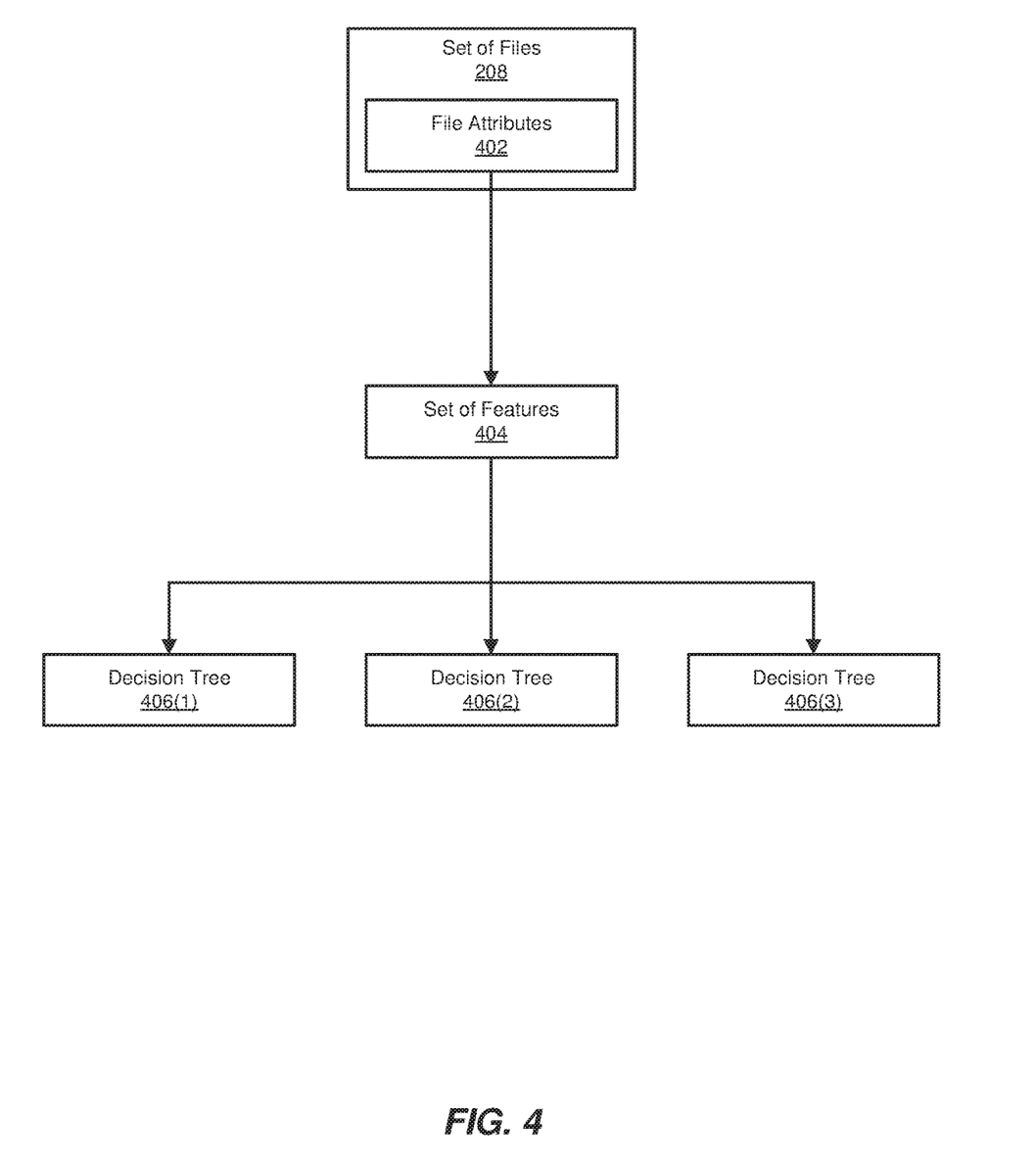
FIG. 4 is a block diagram of an example creation of an example set of decision trees.

As illustrated in FIG. 4, set of files 208 may include file attributes 402, which may then be converted into a set of features 404. Performance module 106 may create decision trees 406(1), 406(2), and 406(3) using set of features 404. In this example, set of features 404 may be adequately classified with three decision trees. In alternate examples, performance module 106 may construct fewer or more decision trees for the set of decision trees. The number of decision trees in the set of decision trees may be adjusted based on a desired accuracy or granularity of classification. For example, the set of decision trees may classify all files similar to a known malicious file in the same classification such that performance module 106 may determine files with similar attributes are related malicious files.

Returning to FIG. 3, at step 306, one or more of the systems described herein may determine, based on the machine learning classification, a node pattern of a suspicious file in the set of files. For example, determination module 108 may, as part of computing device 202 in FIG. 2, determine, based on classification 212, node pattern 122 of suspicious file 210 in set of files 208.

Determination module 108 may determine node pattern 122 in a variety of ways. In some embodiments, determination module 108 may determine node pattern 122 of suspicious file 210 by classifying suspicious file 210 using one or more decision trees in the set of decision trees and identifying a set of nodes based on the decision tree classification. In these embodiments, each node in the set of nodes may be a specific classification result and/or other value derived from a decision tree. Files that are the same or highly similar may result in the same node classifications.

Figure 5:
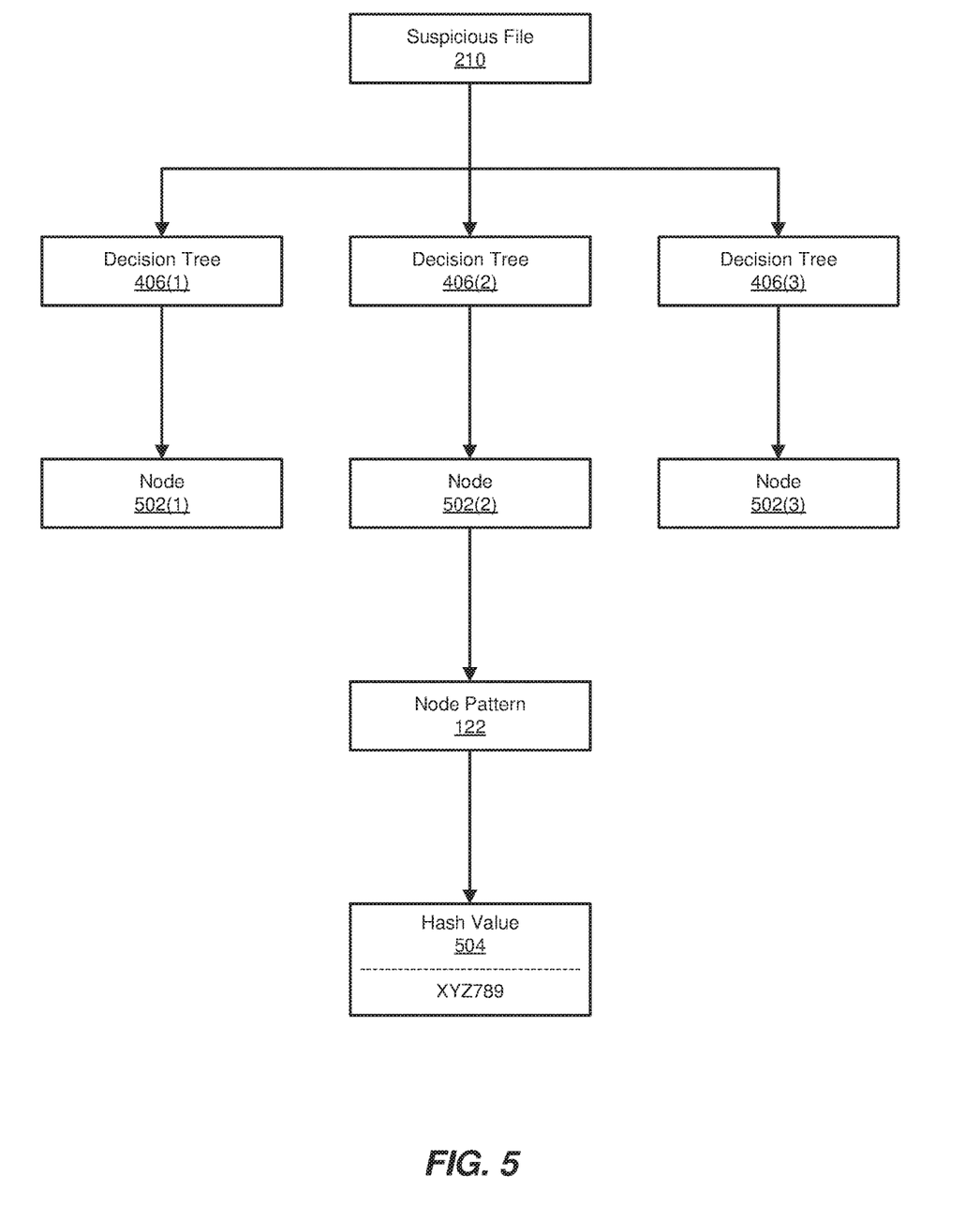
FIG. 5 is a block diagram of an example hash of an example set of nodes for an example suspicious file.

As shown in FIG. 5, determination module 108 may classify suspicious file 210 using decision trees 406(1), 406(2), and 406(3) to obtain a node 502(1), a node 502(2), and a node 502(3), respectively. Determination module 108 may then derive node pattern 122 from nodes 502(1), 502(2), and 502(3). In alternate examples, determination module 108 may use one or two of decision trees 406(1), 406(2), and 406(3) to classify suspicious file 210, depending on the number of classifications needed to obtain an accurate node pattern. For example, only decision tree 406(1) may be required to obtain node pattern 122 that is unique compared to node patterns for files dissimilar to suspicious file 210. Additionally, node pattern 122 may be a common node pattern that indicates suspicious file 210 has similar file attributes to a number of other files.

Returning to FIG. 3, at step 308, one or more of the systems described herein may calculate, by hashing the node pattern, a file prevalence score of the suspicious file. For example, calculation module 110 may, as part of computing device 202 in FIG. 2, calculate, by hashing node pattern 122, file prevalence score 124 of suspicious file 210.

Calculation module 110 may calculate file prevalence score 124 in a variety of ways. In one embodiment, calculation module 110 may hash node pattern 122 by aggregating the set of nodes into a single hash value. In this embodiment, similar node patterns may result in the same hash value. In the example of FIG. 5, calculation module 110 may hash node pattern 122 to derive a hash value 504 (e.g., "XYZ789") for suspicious file 210.

In the above embodiment, calculation module 110 may then calculate file prevalence score 124 by calculating a prevalence of hash value 504 in set of files 208 and/or identifying a family of files for suspicious file 210 based on hash value 504. In this embodiment, the family of files may represent files with the same hash value, which may indicate similar node classifications from the set of decision trees.

Figure 6:
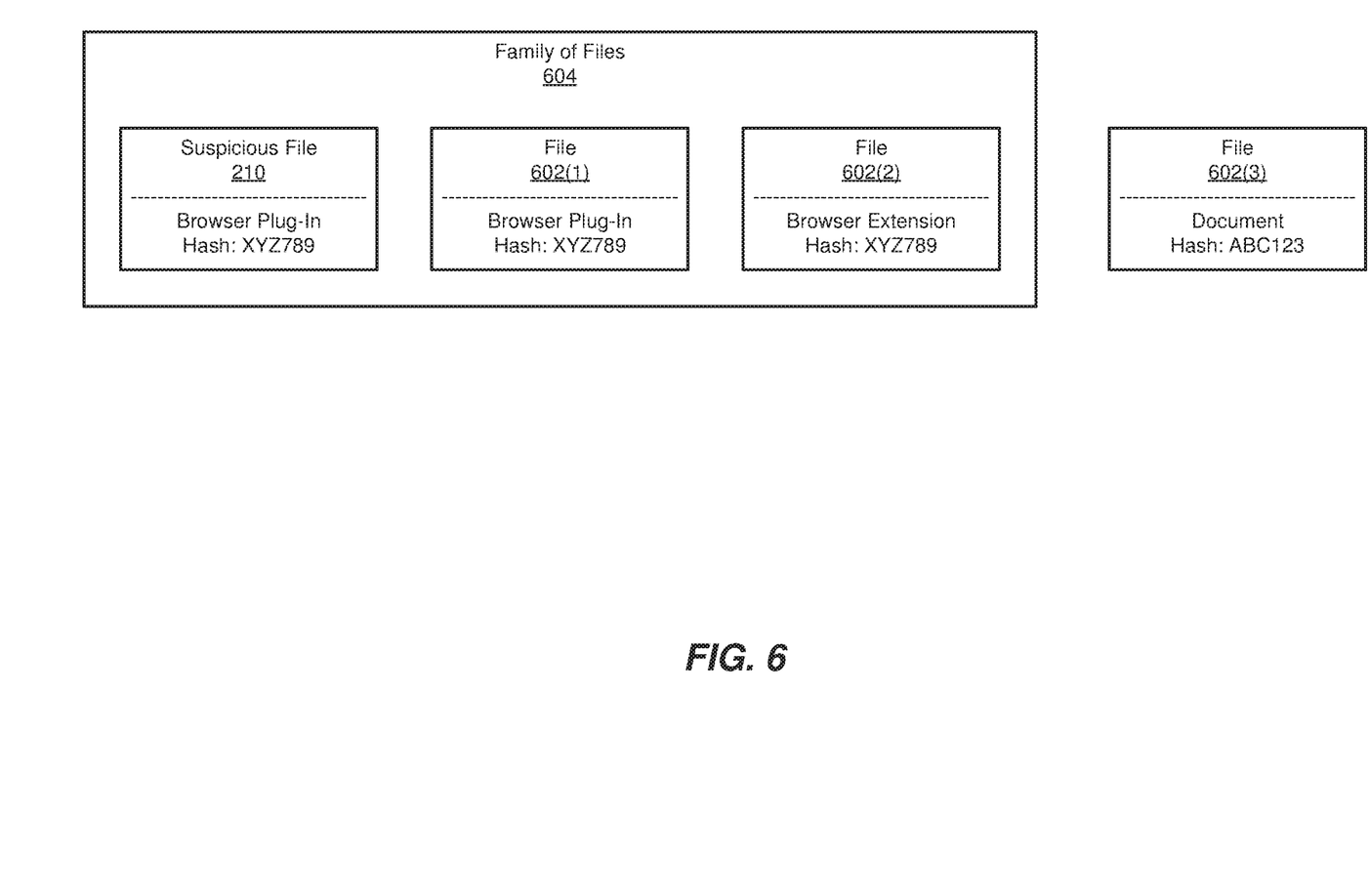
FIG. 6 is a block diagram of an example family of files for an example suspicious file.

As illustrated in FIG. 6, suspicious file 210 may have the same hash value (e.g., "XYZ789") as a file 602(1) and a file 602(2). Calculation module 110 may determine that suspicious file 210, file 602(1), and file 602(2) belong to a family of files 604. A file 602(3) with a different hash value (e.g., "ABC123") may not be part of family of files 604. In this example, files in family of files 604 with the same hash value may indicate the same or similar file attributes that create the same node pattern for the files. Alternatively, file 602(3) may be a unique file with attributes dissimilar to other files in set of files 208.

Returning to FIG. 3, at step 310, one or more of the systems described herein may perform, by the computing device, a security action based on the file prevalence score of the suspicious file. For example, security module 112 may, as part of computing device 202 in FIG. 2, perform security action 214 based on file prevalence score 124 of suspicious file 210.

Security module 112 may perform security action 214 in a variety of ways. In some examples, security module 112 may perform security action 214 by flagging suspicious file 210 as potentially malicious, flagging family of files 604 in FIG. 6 as potentially malicious, quarantining suspicious file 210 on a client device, quarantining another file in family of files 604 on the client device, alerting an administrator about suspicious file 210, and/or alerting an administrator about family of files 604. In these examples, security module 112 may determine security action 214 based on file prevalence score 124 and/or family of files 604. For example, family of files 604 may contain files known to be malicious, and security module 112 may quarantine suspicious file 210 based on its association with family of files 604. As another example, a large number of files in family of files 604 may indicate a highly prevalent security threat in set of client devices 206, and security module 112 may alert the administrator about the prevalence of family of files 604.

In the example of FIG. 6, family of files 604 may contain malicious files, and security module 112 may quarantine all files in family of files 604 for all devices in set of client devices 206. Additionally, family of files 604 may indicate a browser security issue based on information about the files (e.g., "browser plug-in" and "browser extension"). Security module 112 may then alert the administrator about the potential browser security issue associated with family of files 604.

As explained above in connection with method 300 in FIG. 3, the disclosed systems and methods may, by performing machine learning classification on a set of files, improve detection of the prevalence of malicious files. Specifically, the disclosed systems and methods may first train a set of decision trees using attributes of the files. By classifying individual files with the set of decision trees, the systems and methods described herein may determine a set of nodes for each file.

By hashing the set of nodes into a single hash value, the disclosed systems and methods may then determine the prevalence of the file among the set of files. Additionally, the systems and methods described herein may use the hash value to identify a family of related or similar files. In some examples, the systems and methods described herein may also perform a security action to mitigate potentially malicious files that are identified through calculating file prevalence.

As detailed above, by hashing decision tree classifications instead of individual files, the disclosed systems and methods may more accurately calculate file prevalence and identify the correct scope of a security threat for suspicious files and families of related files using static attributes of the files. Furthermore, by performing security actions on suspicious files based on relationships to known malicious files and a prevalence of the related security threat, the disclosed systems and methods may better protect a network of computing devices against malware. Thus, the systems and methods described herein may improve the robustness of file prevalence scores that are used to detect potentially malicious files.

Figure 7:
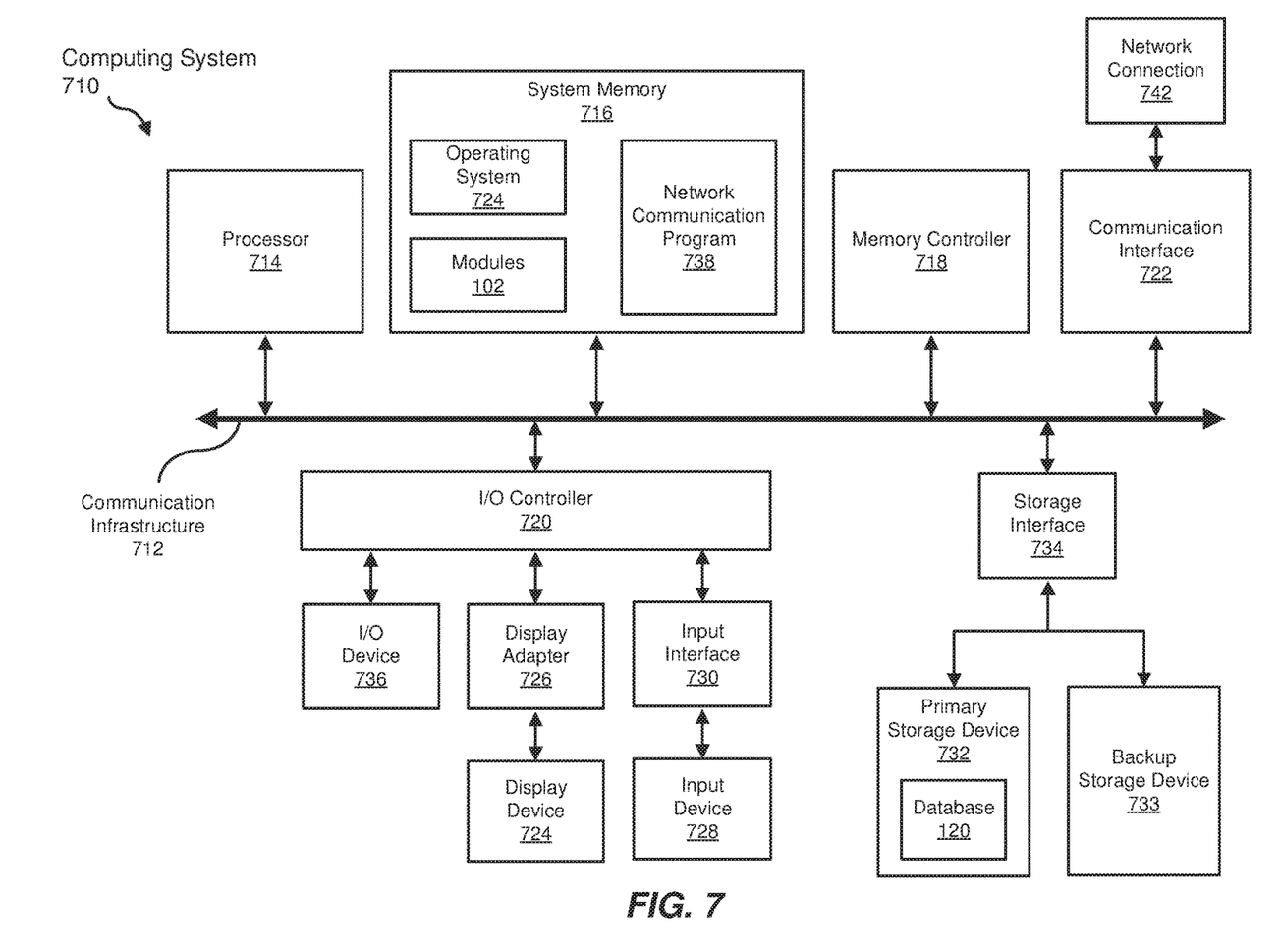
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In some examples, system memory 716 may store and/or load an operating system 724 for execution by processor 714. In one example, operating system 724 may include and/or represent software that manages computer hardware and software resources and/or provides common services to computer programs and/or applications on computing system 710. Examples of operating system 624 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or Application-Specific Integrated Circuit (ASIC) incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored and/or loaded in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an ASIC adapted to implement one or more of the example embodiments disclosed herein.

Figure 8:
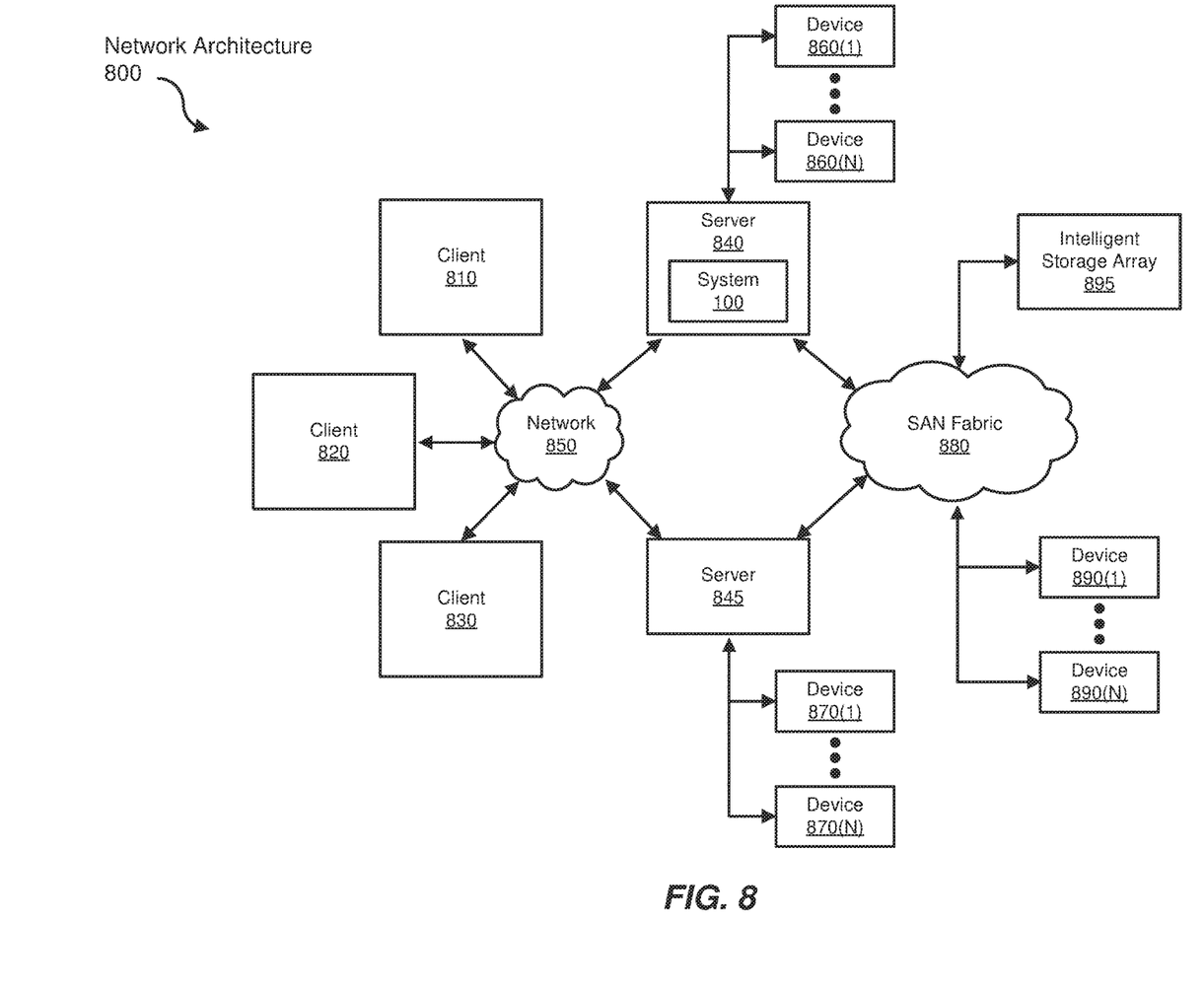
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for identifying malicious computer files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered examples in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive file attributes to be transformed, transform the file attributes, output a result of the transformation to a storage or output device, use the result of the transformation to create a set of decision trees, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components)

connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying malicious computer files, at least a portion of the method being performed by a computing device comprising at least one processor, the method comprising:
   receiving, by the computing device, a set of files from a set of client devices;
   performing, by the computing device, a machine learning classification of file attributes on the set of files;
   determining, based on the machine learning classification, a node pattern of a suspicious file in the set of files, wherein each node of the node pattern comprises a condition for classification;
   calculating a file prevalence score of the suspicious file by:
      hashing the node pattern by aggregating a set of nodes into a single hash value;
      identifying a family of files for the suspicious file based on the hash value, wherein the family of files comprises files with the same hash value; and
      calculating a prevalence of the hash value in the set of files, wherein the prevalence of the hash value indicates the prevalence of the family of files; and
   performing, by the computing device, a security action based on the file prevalence score of the suspicious file.

2. The method of claim 1, wherein the file attributes comprise static attributes derived from at least one of:
   a header of a file;
   metadata of the file; and
   a scan of file contents.

3. The method of claim 1, wherein performing the machine learning classification comprises:
   extracting a set of features from the file attributes; and
   constructing a set of decision trees to classify the set of features.

4. The method of claim 3, wherein determining the node pattern of the suspicious file comprises:
   classifying the suspicious file using at least one decision tree in the set of decision trees; and
   identifying a set of nodes based on the decision tree classification.

5. The method of claim 1, wherein performing the security action comprises at least one of:
   flagging the suspicious file as potentially malicious;
   flagging the family of files as potentially malicious;
   quarantining the suspicious file on a client device;
   quarantining another file in the family of files on the client device;
   alerting an administrator about the suspicious file; and
   alerting an administrator about the family of files.

6. A system for identifying malicious computer files, the system comprising:
   a reception module, stored in memory, that receives, by a computing device, a set of files from a set of client devices;
   a performance module, stored in memory, that performs, by the computing device, a machine learning classification of file attributes on the set of files;
   a determination module, stored in memory, that determines, based on the machine learning classification, a node pattern of a suspicious file in the set of files, wherein each node of the node pattern comprises a condition for classification;
   a calculation module, stored in memory, that calculates a file prevalence score of the suspicious file by:
      hashing the node pattern by aggregating a set of nodes into a single hash value;
      identifying a family of files for the suspicious file based on the hash value, wherein the family of files comprises files with the same hash value; and
      calculating a prevalence of the hash value in the set of files, wherein the prevalence of the hash value indicates the prevalence of the family of files;
   a security module, stored in memory, that performs, by the computing device, a security action based on the file prevalence score of the suspicious file; and
   at least one processor that executes the reception module, the performance module, the determination module, the calculation module, and the security module.

7. The system of claim 6, wherein the file attributes comprise static attributes derived from at least one of:
   a header of a file;
   metadata of the file; and
   a scan of file contents.

8. The system of claim 6, wherein the performance module performs the machine learning classification by:
   extracting a set of features from the file attributes; and
   constructing a set of decision trees to classify the set of features.

9. The system of claim 8, wherein the determination module determines the node pattern of the suspicious file by:
   classifying the suspicious file using at least one decision tree in the set of decision trees; and
   identifying a set of nodes based on the decision tree classification.

10. The system of claim 6, wherein the security module performs the security action by at least one of:
    flagging the suspicious file as potentially malicious;
    flagging the family of files as potentially malicious;
    quarantining the suspicious file on a client device;
    quarantining another file in the family of files on the client device;
    alerting an administrator about the suspicious file; and
    alerting an administrator about the family of files.

11. A non-transitory computer-readable medium comprising one or more computer-executable instructions that, when executed by at least one processor of a computing device, cause the computing device to:
    receive, by the computing device, a set of files from a set of client devices;
    perform, by the computing device, a machine learning classification of file attributes on the set of files;
    determine, based on the machine learning classification, a node pattern of a suspicious file in the set of files, wherein each node of the node pattern comprises a condition for classification;
    calculate a file prevalence score of the suspicious file by:
       hashing the node pattern by aggregating a set of nodes into a single hash value;
       identifying a family of files for the suspicious file based on the hash value, wherein the family of files comprises files with the same hash value; and
       calculating a prevalence of the hash value in the set of files, wherein the prevalence of the hash value indicates the prevalence of the family of files; and
    perform, by the computing device, a security action based on the file prevalence score of the suspicious file.

12. The non-transitory computer-readable medium of claim 11, wherein the file attributes comprise static attributes derived from at least one of:
- a header of a file;
- metadata of the file; and
- a scan of file contents.

13. The non-transitory computer-readable medium of claim 11, wherein the computer-executable instructions cause the computing device to perform the machine learning classification by:
- extracting a set of features from the file attributes; and
- constructing a set of decision trees to classify the set of features.

14. The non-transitory computer-readable medium of claim 13, wherein the computer-executable instructions cause the computing device to determine the node pattern of the suspicious file by:
- classifying the suspicious file using at least one decision tree in the set of decision trees; and
- identifying a set of nodes based on the decision tree classification.

* * * * *